Patented Dec. 14, 1937

2,102,016

UNITED STATES PATENT OFFICE 2,102,016

METHOD OF SEPARATING AN ORGANIC ACID ESTER OF CELLULOSE FROM ITS REACTION MIXTURE

Carl J. Malm and Charles R. Fordyce, Rochester, N. Y., assignors, by mesne assignments, to Eastman Kodak Company, Jersey City, N. J., a corporation of New Jersey No Drawing. Application February 13, 1935, Serial No. 6,412

12 Claims. (Cl. 260—102)

The present invention relates to the separation of an organic acid ester of cellulose from a solution thereof in an organic solvent, such as from its reaction mixture, by employing a tertiary alcohol as the precipitant.

The precipitation of an organic acid ester of cellulose from its solution by employing ethyl alcohol has been recommended in the literature. Altho the use of ethyl alcohol is suitable for the separation of esters from solvents which will not react therewith this is not the case with the precipitation of the ester from the reaction mixture in which it was prepared. The usual spent reaction mixture in the preparation of cellulose esters contains an organic acid such as acetic and a catalyst such as sulfuric, which ingredients cause the formation of ethyl acetate upon mixing ethyl alcohol therewith. Thus alcohol and acid are used up and in addition the recovery of the various ingredients from the spent esterification bath is more difficult than is the case where the precipitant is non-reactive under those conditions towards any of the ingredients of the reaction mixture.

We have found that there is a group of alcohols the members of which exhibit the advantages of that class for precipitating cellulose esters and yet which do not complicate but rather facilitate the recovery of the valuable ingredients of the spent esterification mixture. We have found that the tertiary alcohols such as tertiary butyl or amyl alcohol are eminently suited for the precipitation of organic acid esters of cellulose such as cellulose acetate, cellulose acetate propionate, cellulose acetate butyrate etc. from the reaction mixture in which the ester has been prepared. We have found that the cellulose ester precipitated out in accordance with our invention is in a form whereby it may be easily filtered and washed and after washing and drying readily dissolves in organic solvents.

Our invention broadly comprises the mixing of sufficient tertiary alcohol with the reaction mixture containing the cellulose ester in solution to render the mixture a non-solvent of the ester. Preferably however the ester is precipitated by pouring the reaction mixture into a liquid comprising a tertiary alcohol and an organic acid such as acetic, the composition of this liquid varying with the ester being precipitated out. By this preferred method the product obtained is fluffy and finely divided which is advantageous in the subsequent filtering, washing or dissolving of the ester.

After precipitation, the precipitate may be countercurrently washed with alcohol, preferably a tertiary alcohol, centrifuged and the remaining alcohol removed by boiling the precipitate with water and condensing the vapors. This removal is accomplished due to the fact that an azeotrope is formed by the alcohol and the water. In the case of tertiary butyl alcohol the azeotrope contains 11.6% water which water may be eliminated from the alcohol by passing it over a dehydrating salt such as calcium chloride.

The ingredients of the precipitation bath can easily be reclaimed as the tertiary alcohol may be separated from the organic acid or acids by fractional distillation.

The following examples are illustrative of specific embodiments of our invention:

Example I

A solution of cellulose triacetate in acetic acid, obtained at the end of the esterification of cellulose with acetic anhydride, acetic acid and a catalyst is precipitated after neutralization of the catalyst with sodium acetate by pouring the solution into an excess of a mixture of acetic acid-tertiary butyl alcohol (1:1) accompanied by rapid stirring. A finely divided precipitate which is readily susceptible to washing and filtering is obtained.

Example II

Acetylation of cellulosic material in a reaction bath containing equal proportions of acetyl and propionyl radicals produces a cellulose acetate propionate containing 17% propionyl in solution in its reaction mixture. The catalyst is neutralized by addition of sodium acetate and the ester is precipitated from this solution by pouring it into an access of tertiary butyl alcohol-acetic acid (3:1). A very soft and fluffy precipitate is obtained giving after washing with alcohol and water and drying, a product similar in appearance to the original refined cotton linters which were employed in the preparation of the ester.

Example III

A cellulose triacetate is prepared and hydrolyzed to acetone solubility by adding dilute acetic acid to the mass and allowing it to stand for several hours at 100° F. The catalyst is neutralized by addition of sodium acetate and the hydrolyzed cellulose acetate is precipitated out by pouring the whole into an excess of tertiary butyl alcohol-acetic acid (3:1) accompanied by rapid stirring. A fluffy precipitate was obtained.

In the case of esters which have been hydrolyzed such as hydrolyzed cellulose acetate, acetate propionate or acetate butyrate the proportion of acid to alcohol in the precipitating bath must be reduced below that which may be employed when a fully esterified cellulose is precipitated. For instance if a solution of a hydrolyzed cellulose acetate is precipitated with tertiary butyl alcohol the optimum concentration of acid in the original precipitating bath is about 30%.

The precipitation may be carried out by pouring the tertiary alcohol into the reaction mixture, however, the form in which the ester is obtained when this method is followed is not as susceptible to filtration and solution in organic solvents as that prepared by pouring the reaction mixture into an excess of the tertiary alcohol mixed with organic acid. If desired a mixture of tertiary alcohol and acetic (or other organic) acid may be poured into the reaction mixture instead of the tertiary alcohol alone when that method is employed.

Any of the liquid tertiary alcohols may be employed for separating a cellulose ester from its solution especially in the reaction mixture in which it was formed in accordance with the present invention however the lower tertiary alcohols such as tertiary butyl or tertiary amyl are readily available and will ordinarily be employed in this invention.

If the cellulose ester is in solution in some organic solvent, for instance cellulose acetate in acetone, the ester may be removed therefrom by pouring the solution into an excess of a tertiary alcohol. The tertiary alcohols are suitable for precipitating an organic acid ester of cellulose from its solution in any organic solvent which is miscible with the tertiary alcohol employed.

We claim as our invention:

1. The method of separating an organic acid ester of cellulose from its solution in an organic solvent which comprises pouring the solution into an excess of a precipitating liquid comprising a lower aliphatic tertiary alcohol having the formula $R_3COH$, R representing alkyl groups.

2. The method of separating an organic acid ester of cellulose from its solution in the reaction mixture in which it was formed which comprises mixing the solution with an excess of a precipitating liquid comprising a lower aliphatic tertiary alcohol having the formula $R_3COH$, R representing alkyl groups.

3. The method of separating an organic acid ester of cellulose from its solution in the reaction mixture in which it was formed which comprises pouring the solution into an excess of a precipitating liquid comprising a lower aliphatic tertiary alcohol having the formula $R_3COH$, R representing alkyl groups.

4. The method of separating an organic acid ester of cellulose from its solution in the reaction mixture in which it was formed which comprises pouring the solution into an excess of a precipitating liquid comprising a tertiary alcohol having the formula $R_3COH$, R representing alkyl groups and a lower fatty acid.

5. The method of separating an organic acid ester of cellulose from its solution in an organic solvent which comprises mixing the solution with an excess of a precipitating liquid comprising lower aliphatic tertiary butyl alcohol.

6. The method of separating an organic acid ester of cellulose from its solution in an organic solvent which comprises mixing the solution with an excess of a precipitating liquid comprising tertiary amyl alcohol.

7. The method of separating an organic acid ester of cellulose from its solution in the reaction mixture in which it was formed which comprises pouring the solution into an excess of a precipitating liquid comprising tertiary butyl alcohol.

8. The method of separating an organic acid ester of cellulose from its solution in the reaction mixture in which it was formed which comprises pouring the solution into an excess of a precipitating liquid comprising tertiary amyl alcohol.

9. The method of separating an organic acid ester of cellulose from its solution in the reaction mixture in which it was formed which comprises mixing the solution with an excess of a precipitating liquid comprising tertiary butyl alcohol and a lower fatty acid.

10. The method of separating an organic acid ester of cellulose from its solution in the reaction mixture in which it was formed which comprises mixing the solution with an excess of a precipitating liquid comprising tertiary amyl alcohol and a lower fatty acid.

11. The method of separating an organic acid ester of cellulose from its solution in the reaction mixture in which it was formed which comprises pouring the solution into an excess of a precipitating liquid comprising tertiary butyl alcohol and acetic acid.

12. The method of separating an organic acid ester of cellulose from its solution in the reaction mixture in which it was formed which comprises pouring the solution into an excess of a precipitating liquid comprising tertiary amyl alcohol and acetic acid.

CARL J. MALM.
CHARLES R. FORDYCE.